United States Patent
Marchesini et al.

(10) Patent No.: US 9,126,772 B2
(45) Date of Patent: Sep. 8, 2015

(54) APPARATUS AND RELATED METHOD FOR THE RECOVERY AND THE PNEUMATIC TRANSPORTATION OF DUST COMING FROM A FILTRATION SYSTEM

(75) Inventors: Vainer Marchesini, San Prospero (IT); Luca Golinelli, San Possidonio (IT)

(73) Assignee: WAM INDUSTRIALE S.P.A., Modena (IL)

( * ) Notice: Subject to any disclaimer, the term of this patent is extended or adjusted under 35 U.S.C. 154(b) by 942 days.

(21) Appl. No.: 13/255,783

(22) PCT Filed: Mar. 10, 2010

(86) PCT No.: PCT/IB2010/000503
§ 371 (c)(1),
(2), (4) Date: Dec. 22, 2011

(87) PCT Pub. No.: WO2010/103382
PCT Pub. Date: Sep. 16, 2010

(65) Prior Publication Data
US 2012/0099934 A1    Apr. 26, 2012

(30) Foreign Application Priority Data

Mar. 11, 2009    (IT) .............................. BO2009A0147

(51) Int. Cl.
B65G 53/36    (2006.01)
B65G 53/14    (2006.01)
B01D 46/48    (2006.01)

(52) U.S. Cl.
CPC ................ *B65G 53/14* (2013.01); *B01D 46/48* (2013.01)

(58) Field of Classification Search
USPC ..................... 406/126, 92, 144, 194
See application file for complete search history.

(56) References Cited

U.S. PATENT DOCUMENTS

| | | | | |
|---|---|---|---|---|
| 1,901,932 A | * | 3/1933 | Schaub ........................... | 406/25 |
| 1,908,220 A | * | 5/1933 | Chapman ........................ | 406/92 |
| 2,734,782 A | * | 2/1956 | Galle ............................. | 406/132 |
| 2,938,751 A | * | 5/1960 | Nogami .......................... | 406/48 |

(Continued)

FOREIGN PATENT DOCUMENTS

| | | |
|---|---|---|
| EP | 0 847 788 A1 | 6/1998 |
| GB | 2 368 578 B | 5/2002 |

OTHER PUBLICATIONS

European Patent Office, PCT International Search Report and Written Opinion of the International Searching Authority for International Application No. PCT/IB2010/000503 dated Jul. 26, 2010.

*Primary Examiner* — Joseph Dillon, Jr.
(74) *Attorney, Agent, or Firm* — Christopher J. Knors; Moore & Van Allen, PLLC

(57) ABSTRACT

An apparatus and related method for the recovery and the pneumatic transportation of dust coming from a filtration system provided with a particulate collection hopper. The apparatus comprises:
 an intermediate chamber for the passage of the particulate towards the evacuation means; and
 shutting means for a bottom opening (AP1) of said hopper. The apparatus is characterized in that the shutting means comprise, in turn, a shutter moved according to an arrow (ARW) by the action of intermittent pressurized air that flows in a control conduit forming part of said shutting means. Furthermore, the evacuation means comprise elements, specifically a nozzle aligned with a Venturi, to produce a pressure drop in the intermediate chamber.

12 Claims, 1 Drawing Sheet

(56) References Cited

U.S. PATENT DOCUMENTS

| | | | | |
|---|---|---|---|---|
| 2,943,890 A | * | 7/1960 | Hrabovszky et al. | 406/126 |
| 2,989,349 A | * | 6/1961 | Hartley | 406/142 |
| 3,173,725 A | * | 3/1965 | Dietert | 406/91 |
| 3,199,924 A | * | 8/1965 | Mueller et al. | 406/126 |
| 3,237,805 A | * | 3/1966 | Stogner | 406/130 |
| 3,592,363 A | * | 7/1971 | Stout et al. | 406/94 |
| 3,644,003 A | * | 2/1972 | Von Funk | 406/126 |
| 3,804,303 A | * | 4/1974 | Fassauer | 406/71 |
| 4,111,492 A | | 9/1978 | Mraz | |
| 4,938,848 A | * | 7/1990 | Raines et al. | 205/392 |
| 5,209,608 A | | 5/1993 | Edwards | |
| 5,490,745 A | * | 2/1996 | Thiele et al. | 406/132 |
| 6,079,911 A | * | 6/2000 | Wangermann et al. | 406/132 |
| 8,430,230 B1 | * | 4/2013 | Ferguson et al. | 198/550.1 |
| 8,936,416 B2 | * | 1/2015 | Stutz et al. | 406/132 |
| 2003/0133759 A1 | | 7/2003 | Winther | |

* cited by examiner

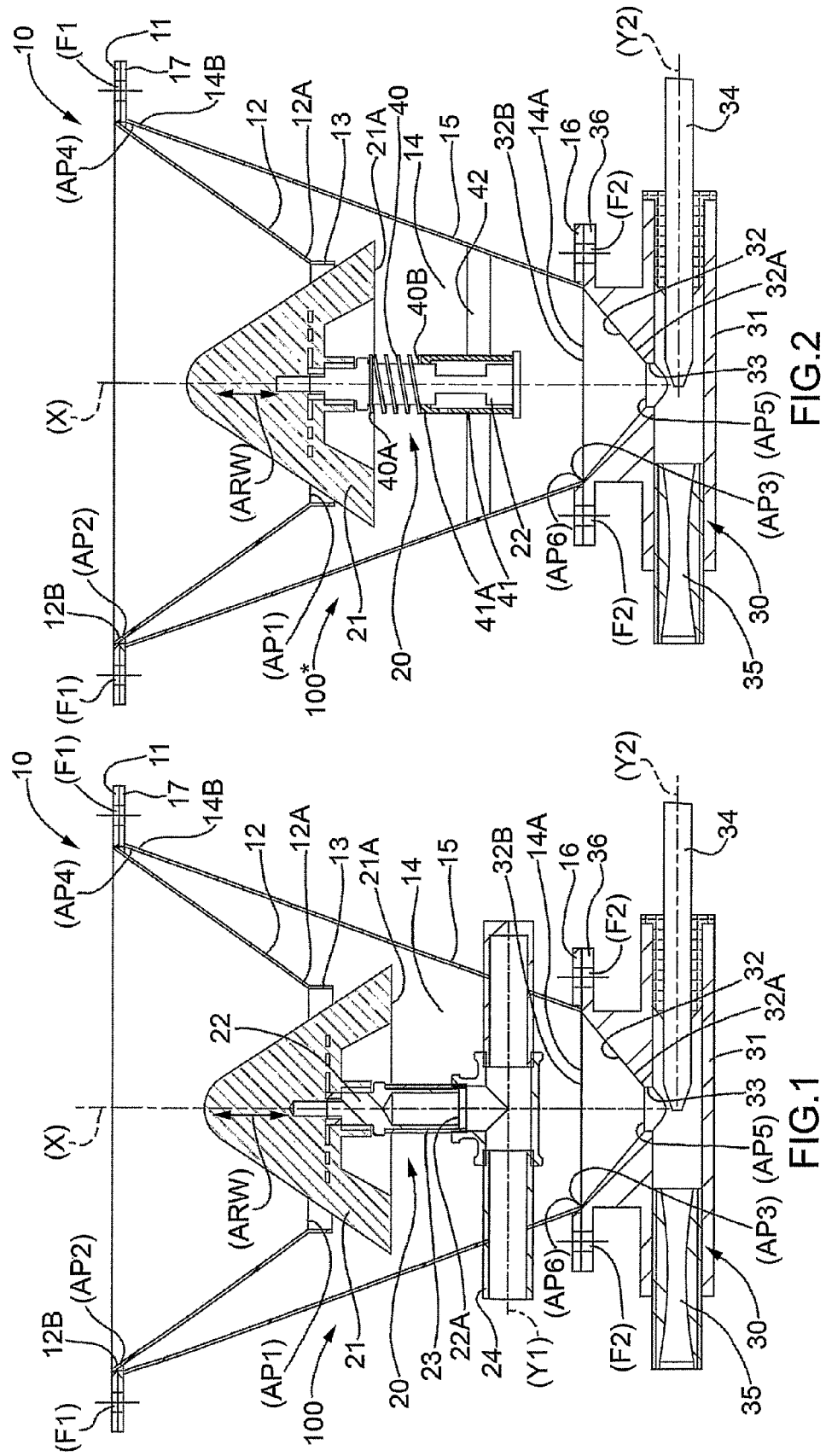

APPARATUS AND RELATED METHOD FOR THE RECOVERY AND THE PNEUMATIC TRANSPORTATION OF DUST COMING FROM A FILTRATION SYSTEM

TECHNICAL FIELD

The present invention relates to an apparatus and related method for the pneumatic recovery of dust coming from a filtration system.

BACKGROUND ART

As is known, the hopper of a filter collects the dust that is extracted and filtered until the extractor can be switched off (for example, at the end of the shift or at the end of the working day). Immediately after switching off, a closing valve of the discharge of the hopper is opened and the filtered particulate is evacuated, by means of a screw or a pneumatic transportation system, towards another collection system.

In many cases, the evacuation system of the filtered particulate must be overscaled as it is necessary to empty the bottom of the hopper in the shortest time possible, with evident problems in terms of cost and space (in some cases, the height of the filter must be increased).

In any case, the most common system for evacuation of the filtered particulate envisages the use of a 50-75 liter recipient which is emptied periodically by hand by at least two operators.

This operation therefore involves the use of considerable manpower and exposure of the operators to contact and/or inhalation of particulate present in the transfer recipient.

Moreover, the particulate must then be transferred into larger containers with a further loss of time and further exposure of the operators to the particulate. Furthermore, a portion of particulate may be dispersed in the surrounding environment with evident negative effects on this.

As there may be a large number of filters in production plants, the cost of labour and frequency of exposure to dust are significant.

The problem of emptying filters mainly arises with extraction filters (i.e. with internal pressure drop). In this case, when the dust discharge valve is opened, the air is also drawn in through the valve, thereby raising the dust in the hopper so that it does not escape through the filter.

Above all, the air drawn in by the dust discharge valve, when it is opened, is not sent to an evacuation conduit, thereby downgrading overall performance of the filtration system.

DISCLOSURE OF INVENTION

The purpose of the present invention is, therefore, to provide an apparatus for the pneumatic removal of dust from a filtration system which overcomes the drawbacks described above and which is, at the same time, easy and economical to produce.

In particular, with the apparatus which represents the maim embodiment of the present invention, a method is adopted that comprises the following steps:

(a) the bottom of a hopper is closed by operating a shutter;

(b) a pressure drop is achieved in an intermediate chamber placed below the hopper; the pressure drop in the intermediate chamber being greater than the pressure drop in the filter and in the hopper;

(c) the action on the shutter is interrupted for a pre-determined time and the shutter is displaced downwards due to the effect of its weight and the pressure drop present in the intermediate chamber; the bottom of the hopper is opened and the particulate, which has deposited on the surface of the shutter, is conveyed towards evacuation means;

(d) operation on the shutter is re-established by closing of the bottom of the hopper again; and (e) transportation of the particulate by means of the evacuation means starts.

BRIEF DESCRIPTION OF THE DRAWINGS

In order to better understand the present invention, some non-limiting preferred embodiments thereof will now be described, by way of example and with reference to the accompanying drawings in which:

FIG. 1 illustrates a first embodiment of the apparatus to which the present invention refers; and FIG. 2 shows a second embodiment of the apparatus to which the present invention refers.

BEST MODE FOR CARRYING OUT THE INVENTION

In FIG. 1, designated as a whole by number 100 is an innovative apparatus for pneumatic dust removal of an overhead filtration system 10.

The filtration system 10 comprises, in a conventional manner, a filter (not shown in the figure) fitted on an upper flange 11 of a hopper 12 for collection of dust coming from said filter.

As shown in FIG. 1, the hopper 12 is of an "inverted" truncated cone shape, in that the smaller base 12A of the truncated cone is arranged below the larger base 12B of said truncated cone.

At the position of the smaller base 12A, there is an opening (AP1) through which the dust is discharged from the hopper 12 towards an evacuation system (see below).

Similarly, the upper base is characterised by an opening (AP2) that connects the filter and the hopper 12.

The smaller base envisages, advantageously, a cylindrical collar 13.

Below and around the hopper 12, there is an intermediate chamber 14, also advantageously but not necessarily of an inverted truncated cone shape. The perimeter of the intermediate chamber 14 is delimited by a wall 15.

In turn, the intermediate chamber 14 has a smaller lower base 14A provided with a flange 16, for the purposes described in more detail below, and a larger upper base 14B, in use substantially above the larger base 12B of the hopper 12.

Similarly, as indicated for the hopper 12, at the position of the smaller base 14A of the intermediate chamber 14 there is an opening (AP3), while the larger base 14B has an opening (AP4) substantially above said opening (AP2) of said hopper 12.

Also, a respective flange, resting in use on said flange 11 of the hopper 12 is integral with the surround of the larger base 14B.

Furthermore, the two flanges 11, 17 are provided with a plurality of through holes (F1) which are used to fasten the filter to the hopper 12 and to the intermediate chamber 14.

As shown also in FIG. 1, inside the intermediate chamber 14 and, therefore, below the hopper 12, there is a shutting device 20 of the opening (AP1) of said hopper 12.

Such shutting device 20 comprises a shutter 21 (substantially conical in shape) integral to a piston 22 able to slide in a vertical cylinder 23 having an axis (X) perpendicular to an axis (Y1) of a horizontal compressed air supply conduit 24.

Between the piston 22 and the wall of the cylinder 23, there is a port allowing modest seepage of the compressed air from the conduit 24 to the intermediate chamber 14 for the purpose that will be illustrated subsequently (see below).

The vertical cylinder 23 and the horizontal conduit 24 are pneumatically connected to each other so that the pressurised air (for example at 6 bar) in the conduit 24 holds the shutter 21 lifted so that the surface of the shutter 21 closes the opening AP1 (the raised position of the shutter 21 is not shown in FIG. 1).

In other words, the air that flows in the conduit 24 is at a pressure whereby the force it exerts on a base 22A of the piston 22 keeps the shutter 21 (integral to the piston 22) raised, overcoming any forces that would push said shutter 21 down (see below).

For the purposes that will be explained in detail below, when describing overall functioning of the apparatus 100 (see below), the pressurised air that flows in the conduit 24 is regulated by an ON/OFF electrovalve (not shown) controlled by a control means, not illustrated, for example, a timer.

Furthermore, dust evacuation means 30 are housed beneath the intermediate chamber 14.

Said dust evacuation means 30 comprise a main body which comprises a cut-away section 32 also of inverted truncated cone shape and having an axis (X).

The lower part of the cut-away section 32 terminates in a vertical conduit 33 (again having an axis (X)) which conveys the particulate to the mouth of a nozzle 34 whose jet of compressed air is directed towards the inlet of a Venturi 35.

The nozzle 34 and the Venturi 35 are housed, at least partially, in related housings obtained in the main body 31. Furthermore, the nozzle 34 and the Venturi 35 are aligned along an axis (Y2) parallel to the axis (Y1) and therefore perpendicular to the axis (X).

Advantageously but not necessarily, air with a pressure (for example, of 6 bar) that is the same as that of the pressurised air that transits in the conduit 24 flows into the nozzle 34.

Also, both the conduit 24 and the nozzle 34 can be connected pneumatically to the air treatment unit (not shown) which produces pressurised air for cleaning the filter.

The cut-away section 32 has, in turn, a smaller base 32A with an opening (AP5) and a larger base 32B to which an opening (AP6), coinciding with said opening (AP3) of the intermediate chamber 14 corresponds.

On the upper part of the main body 31, there is a flange 36 which, in use, rests on the flange 16 integral with the intermediate chamber 14.

Furthermore, the two flanges 16, 17 are provided with a plurality of through holes (F2) used, specifically, to fasten the dust evacuation means 30 to the bottom of the intermediate chamber 14 by means of known fastening means not illustrated.

The flow of compressed air in the nozzle 34 may be continuous or may be regulated by means of an electrovalve and a timer, set according to the rate of work of the filter and its filtration capacity.

In the case in which the compressed air must exit the nozzle 34 in the form of intermittent jets, said intermittent compressed air used to clean the filters can be used directly to supply said nozzle 34.

In various tests carried out on an apparatus of the type shown in the figure, air consumed for functioning, the amount of product transported and the pressure drop reached in the intermediate chamber with the Venturi activated were measured.

By way of example, the following operating parameters are indicated:

Maximum product capacity: 60 Kg/h.
Supply pressure: 4-6 bar.
Air consumption: 18-20 Nm3/h.
Diameter of the transportation tube: 1".
Max. length of the transportation tube: 10 meters.
Useful volume: 5 dm3.
Pressure drop in the filter: 100-200 mmH2O
Pressure drop in the intermediate chamber: 250-450 mmH2O In a second embodiment shown in FIG. 2, an apparatus 100* different from the apparatus 100 illustrated in FIG. 1 has been considered.

In said apparatus 100*, the shutter 21 is normally maintained in a closed position and is preloaded by the elastic force exerted by a helical spring 40 wound on at least one portion of the piston 22.

A first end 40A of the spring 40 rests on a lower face 21A of the shutter 21, while a second end 40B of the spring 40 rests on an upper edge 41A of a bush 41 held in position and aligned according to the axis (X) with at least three spokes 42 (only two are visible in FIG. 2) fastened to the conical wall 15 of the intermediate chamber 14.

In this case, conveying intermittent pressurised air to the nozzle 34 facing towards the Venturi 35, a pressure drop is generated in the intermediate chamber 14 so as to overcome the elastic forces exerted by the helical spring 40 on the shutter 21, with consequent downwards displacement of the piston 22 (which slides freely in the bush 41) and of the shutter 21, thereby opening the bottom of the hopper 12. At the same time, due to the pressure drop existing in the intermediate chamber 14, the particulate is drawn up from the bottom of the hopper 12 towards said intermediate chamber 14 and thus into the dust evacuation means 30.

Functioning of the apparatus 100 according to the present invention will now be described with reference to FIG. 1.

The dust evacuation means 30, by means of a small continuous flow of air through the nozzle 34 towards the Venturi 35, generate a pressure drop in the intermediate chamber 14 which is closed in the upper part by the shutter 21 activated by the respective shutting means 20.

The shutter 21 could consist of a cone of polyurethane that does not require the aid of further seals and which can slide up from the bottom and vice versa, according to the direction of a double-pointed arrow (ARW).

The pressure drop produced by the Venturi 35 in the intermediate chamber 14 is greater than the pressure drop present in the filter and in the hopper 12.

Therefore, when the flow of compressed air in the conduit 24 is interrupted, the shutter 21 is displaced downwards due to the effect of its weight and the pressure drop present in the intermediate chamber 14, and the particulate that has deposited on the surface of the shutter 21 is drawn (due to the effect of the greater pressure drop) towards the Venturi 35.

After a few seconds, the flow of compressed air in the conduit 24 is re-established (by the electrovalve and by the timer which regulate opening/closing of the flow of compressed air in the conduit 24). Thus, when the flow in the conduit 24 is re-established, the piston 22 and the shutter 21 move up again so that said shutter 21 closes the opening (AP1) again.

At this point, the Venturi 35 starts to transport the particulate present in the cut-away section 32 and in the conduit 33 towards an evacuation system (not shown).

Furthermore, the compressed air that seeps between the wall of the cylinder 23 and the piston 22 helps to push the particulate towards the Venturi 35 and increases the efficiency of said Venturi 35 which, therefore, can be of reduced size.

The intermediate chamber 14 has sloping walls and can be installed beneath the hopper 12 without requiring too much space.

The evacuation means 30, due to their low consumption, can always be supplied with the same compressed air of the filter, but can also be supplied intermittently by an electric or pneumatic timer.

With the present invention, by means of alternating pressure drop/pressure and by operating a shutter 21 that moves vertically (according to the direction of the arrow (ARW)), it is possible to obtain a system that does not require interruption of functioning of the filter, has a single shutter means 20, is of reduced size and does not consume additional compressed air other than that used for cleaning of the filter.

The main advantage of the dust recovery apparatus described above consists in the fact that it permits recovery of particulate from the hopper of the filtration system and transportation of this to a container, without interrupting extraction and without affecting the performance of the filtration system, as a small size pneumatic transportation system with low consumption is used.

A further advantage of the present apparatus and of the related method certainly consists in the way in which particulate is recovered from the filter, by producing a greater pressure drop than that present in the filter, and with the addition of the pressure in the intermediate chamber during the transportation phase of the Venturi.

In this way it is possible to construct an efficient small pneumatic transportation system using little air, thus involving low initial costs and low operating costs.

Furthermore, using the present apparatus can reduce the labour required and operator exposure to dust.

Functioning with low volumes of air means that the dust recovery system downstream of the apparatus according to the present invention can have a filtration system of limited size.

The invention claimed is:

1. Apparatus for the recovery and pneumatic transportation of dust coming from a filtration system, the apparatus comprising
    a particulate collection hopper having a bottom opening evacuation means;
    an intermediate chamber for the passage of particulate towards the evacuation means;
    shutting means coupled to the bottom opening of said particulate collection hopper;
    a control conduit comprising opening/closing means for compressed air flow; and
    a port between the piston and the wall of the cylinder the port allowing seepage of the compressed air from the control conduit into the intermediate chamber;
    wherein said shutting means comprise air flow control means including a shutter displaceable by the action of pressurised air that flows in said air flow control means;
    wherein said evacuation means comprise means to produce a pressure drop in said intermediate chamber
    wherein the shutter is integral with a piston slidable along a wall in a cylinder; and
    wherein said shutting means is configured to cause a surface of the shutter to close the bottom opening of said particulate collection hopper when said air flow control means receives pressurized air.

2. Apparatus according to claim 1, characterised in that said opening/closing means for the compressed air flow is controlled automatically or manually.

3. Apparatus according to claim 1, wherein the piston slides in a vertical cylinder having an axis (X).

4. Apparatus according to claim 3, characterised in that a conduit is positioned horizontal to the vertical cylinder and they are pneumatically connected to one another, so that the pressurised air in the conduit holds the shutter lifted so that the surface of the shutter closes the opening.

5. Apparatus according to claim 1, characterised in that said means to produce a pressure drop in said intermediate chamber comprise a nozzle aligned with a Venturi.

6. Apparatus according to claim 5, characterised in that the nozzle provides continuous compressed air flow.

7. Apparatus according to claim 5, characterised in that the compressed air flow in the nozzle is regulated.

8. Apparatus according to claim 1, characterised in that the same air passes through the conduit and the evacuation means.

9. Apparatus according to claim 8, characterised in that both the conduit of the shutting device and the evacuation means are pneumatically connected to an air treatment system.

10. Apparatus according to claim 1, characterised in that said shutter is normally maintained in a closed position and is preloaded by an elastic force exerted by elastic means; by conveying intermittent air to said evacuation means, a pressure drop is generated in the intermediate chamber so as to overcome the elastic forces exerted by the elastic means on the shutter, thus displacing the shutter downwards and thereby opening the bottom of the hopper.

11. Apparatus according to claim 10, characterised in that due to the pressure drop existing in the intermediate chamber, the particulate is drawn up from the bottom of the hopper towards the intermediate chamber and therefore towards the evacuation device.

12. Apparatus according to claim 1, characterised in that said shutting means comprise a substantially conical shaped shutter.

* * * * *